United States Patent
Paulus et al.

(10) Patent No.: US 6,678,757 B1
(45) Date of Patent: Jan. 13, 2004

(54) PRINT DATA MANAGEMENT SYSTEM AND METHOD

(75) Inventors: Damien Paulus, Clamart (FR); Didier Pierre Conard, Saint Maur des Fossés (FR)

(73) Assignee: Océ-Technologies B.V., MA Venlo (NL)

( * ) Notice: Subject to any disclaimer, the term of this patent is extended or adjusted under 35 U.S.C. 154(b) by 0 days.

(21) Appl. No.: 09/646,420

(22) PCT Filed: Mar. 17, 1999

(86) PCT No.: PCT/NL99/00149
§ 371 (c)(1),
(2), (4) Date: Dec. 12, 2000

(87) PCT Pub. No.: WO99/47997
PCT Pub. Date: Sep. 23, 1999

(30) Foreign Application Priority Data

Mar. 18, 1998 (EP) .............................................. 98400639

(51) Int. Cl.[7] .......................... G06F 13/14; G06F 13/20
(52) U.S. Cl. .............................. 710/52; 710/33; 710/35; 710/53; 710/57
(58) Field of Search ............................. 710/33, 35, 52, 710/53, 57

(56) References Cited

U.S. PATENT DOCUMENTS

| | | | |
|---|---|---|---|
| 4,829,468 A | | 5/1989 | Masuda et al. |
| 5,210,829 A | * | 5/1993 | Bitner .......................... 710/57 |
| 5,576,840 A | * | 11/1996 | Fukushima ................... 386/46 |
| 5,706,411 A | | 1/1998 | McCormick et al. |
| 5,727,135 A | | 3/1998 | Wellman et al. |
| 6,101,329 A | * | 8/2000 | Graef ........................... 710/52 |
| 6,192,422 B1 | * | 2/2001 | Daines et al. .................. 710/29 |
| 6,226,533 B1 | * | 5/2001 | Akahane ...................... 455/566 |

FOREIGN PATENT DOCUMENTS

| EP | A585131 | 3/1994 |
|---|---|---|

* cited by examiner

*Primary Examiner*—Rehana Perveen
(74) *Attorney, Agent, or Firm*—Birch, Stewart, Kolasch & Birch, LLP

(57) ABSTRACT

A print data management system includes a memory to store print data; a controller to transfer the stored print data to a printer; and a user interface to indicate to a user a degree of occupation of the memory by the print data, the user interface including first and second distinct forms of indication respectively corresponding to a range of low occupation and a range of high occupation of the memory, the user interface further including a setting unit to variably set boundaries of at least one of the ranges of high and low occupations by the user.

17 Claims, 2 Drawing Sheets

PRINT DATA MANAGEMENT SYSTEM AND METHOD

Figure 1:
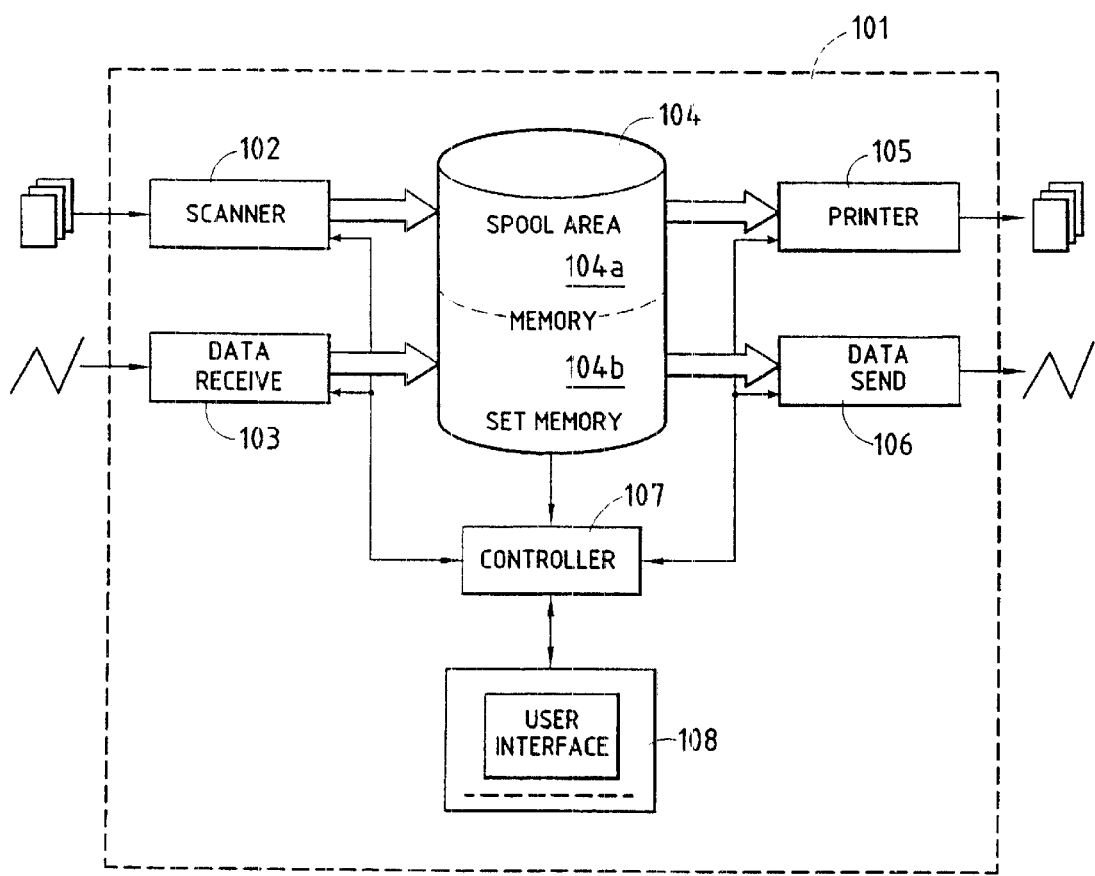

The present invention relates to a print data management system and method for a digital print reproduction system, in which print data are loaded into a set memory prior to be being printed. More specifically, the invention addresses the problem of providing a clear and reliable indication to a user of the state of occupation of the set memory so to ensure an optimum use of print resources.

A classical print data management system centralises print data from one or a group of sending sources, such a scanner, a personal computer or other terminal and directs that data to one or several printer(s) under appropriate conditions (form, sequence, print parameters etc.).

A typical example of a system in which a print management system is implemented comprises a print data source such as a scanning means in which paper originals are scanned and converted to electronic image data, a set memory for storing the electronic image data, and printing means for printing the the image data stored in the memory. The print management system controls the set memory to ensure that the print data from the source(s) are properly printed under appropriate conditions.

The use of a set memory from which print data are fed to the printing means is now common in modern digital print reproduction systems. Such a set memory is provided with bit-map data from the print data source, corresponding to the contents of the page(s) to be printed. Its capacity has to be sufficient to store print data corresponding to a number of pages of printed documents in a printing queue, commonly referred to as print jobs. If the print data source loads a quantity of data into the set memory exceeding the remaining capacity of the latter, an overflow condition occurs. In this case, the operation of loading the data is interrupted and has to be repeated at a later stage when the set memory resumes sufficient free space to accept the data. This situation slows down the printing process and often calls for additional manipulations on behalf of the operator, resulting in a lower operating efficiency.

In view of this problem, it is known in the prior art to provide a visual indication of the state of occupation of the memory. This indication is generally implemented in the form of an electronic display bar which shows the percentage of the memory already used at any one time. However, it has been found that such a display fails to inform clearly to the user when the memory occupation reaches such a level that the next transfer of print data into the set memory—e.g. from a scanning operation—is likely to create an overflow.

It is an object of the present invention to improve the quality of the visual indication provided to the user and thereby solve the technical problem of enabling the operator to achieve a more efficient control of flow of print data during printing.

To this end, the present invention provides a print data management system comprising: means for receiving print data, memory means for storing said received print data, control means for controllably reading out data from said memory means and transferring said print data to printing means, and visual indication means for informing a user of the degree of occupation of said memory means by said print data, characterised in that said visual indication means has at least first and second visually distinct forms of indication respectively corresponding to a range of relatively low occupation and a range of relatively high occupation.

By thus dividing the indication means into visually distinct forms of indication, the user can quickly determine the range of degree of occupation of the memory means simply by noticing the form of the indication. It can be noted that the ranges are complementary.

In a preferred embodiment of the present invention, the visual indication means comprises a third form of indication, visually distinct from said first and second forms, and corresponding to an intermediate range of occupation of said memory means.

The layout of the indication means can adopt many forms. In a preferred embodiment, the indication means forms a bar graph implemented by a monitor screen. The latter can form part of personal computer associated with the print management system. It can also be envisaged to use linear arrays of light-emitting diodes (LEDs) or equivalent elementary display devices, or a liquid crystal display configured to an appropriate pattern of symbols.

Advantageously, the forms of indication are made visually distinct by colour, e.g. by using different colours for the ranges forming a bar graph or other presentation. For example, a first colour such as green is used to indicate a relatively low range of degrees of occupation and a second colour, such as red, is used to indicate a relatively high range of degrees of occupation. If used, the third form of indication, corresponding to the aforementioned intermediate range of degree of occupation, can be distinguished in form from the other two ranges by a third colour, such as orange.

Naturally, the present invention can be implemented with more than one visually distinct intermediate range, e.g. by using different colours for different the intermediate ranges.

Instead of using a bar graph presentation, the display means can provide e.g. by a pie chart, pictorial representations, etc.

There are other ways than by colour of making the forms of visual indication distinct. For example, each displayed range can be correspond to a specific display pattern. The patterns can differ from each other by levels of grey in a monochrome display, by the shape of symbols used to express the degree occupation for each range, or by the size of the symbols used to express the degree of occupation for each range.

It is also envisageable to make the forms of indication visually distinct by playing on the dynamic parameters of the display. For instance, the indication showing a degree of occupation in a low range can be flashed at a low frequency, or be static, whilst the indications showing a high degree of occupation can be made to flash at a higher frequency.

The ranges of degree of occupation shown by the visual indication means need not necessarily have fixed boundaries. Indeed, the ranges can be made variable by user command and/or by internal commands. To this end, the apparatus in accordance with the present invention may be provided with means for setting the extent of at least the range corresponding to a relatively high degree of occupation.

In this way, the ranges of degree of occupation can be tailored to specific applications or circumstances. For instance, the user may wish the visual indication means to inform him or her of the degree of occupation more in terms of an estimated number of print documents that can be loaded into the memory means before an overflow condition is likely to arise. For example, the operator may want the visual indication means to start to indicate a high level of occupation when only about three (say) more print documents can be loaded into the memory means. This in turn calls for a configuration of the ranges as a function of the known or estimated lengths of the print documents. Such information may be held by the user, for instance based on his or her experience, or on the nature of the tasks concerned by the application. In this case, means may be provided to set manually the different range limit(s) according to requirements.

The print data management system can also be provided with means for determining the size of the print documents about to be loaded into the memory means and for adjusting the range(s) shown in the visual indication means correspondingly, so that the high occupation range is entered when a predetermined number of print documents can be loaded before an overflow condition arises. As a general rule, it can be stated that the larger size of the print document(s) to be loaded into the memory, the larger the extent of the zone corresponding to an indication of high memory occupation.

The print data management system can equally be provided with means for estimating the size the print documents about to loaded into the memory means through a statistical calculation based on previously loaded documents.

The present invention also concerns a method of managing print data in a digital print reproduction system, comprising the steps of: receiving print data, storing said received print data in memory means, controllably reading out data from said memory means and tranferring said print data to printing means, and providing a visual indication for informing a user of the degree of occupation of said memory means by said print data, characterised in that said step of providing a visual indication involves providing at least first and second visually distinct forms of indication respectively corresponding to a range of relatively low occupation and a range of relatively high occupation of said memory means.

Preferably, the visual indication means is further provided with a third form of indication, visually distinct from said first and second forms, and corresponding to an intermediate range of occupation of said memory means.

The print data management method can be implemented on the basis of the print data management system of the invention in accordance with any one or combination of the variants described.

The method can additionally comprise a step of setting the size of at least the range corresponding to a relatively high degree of occupation. This can be effected manually and/or by internal commands.

Figure 2:
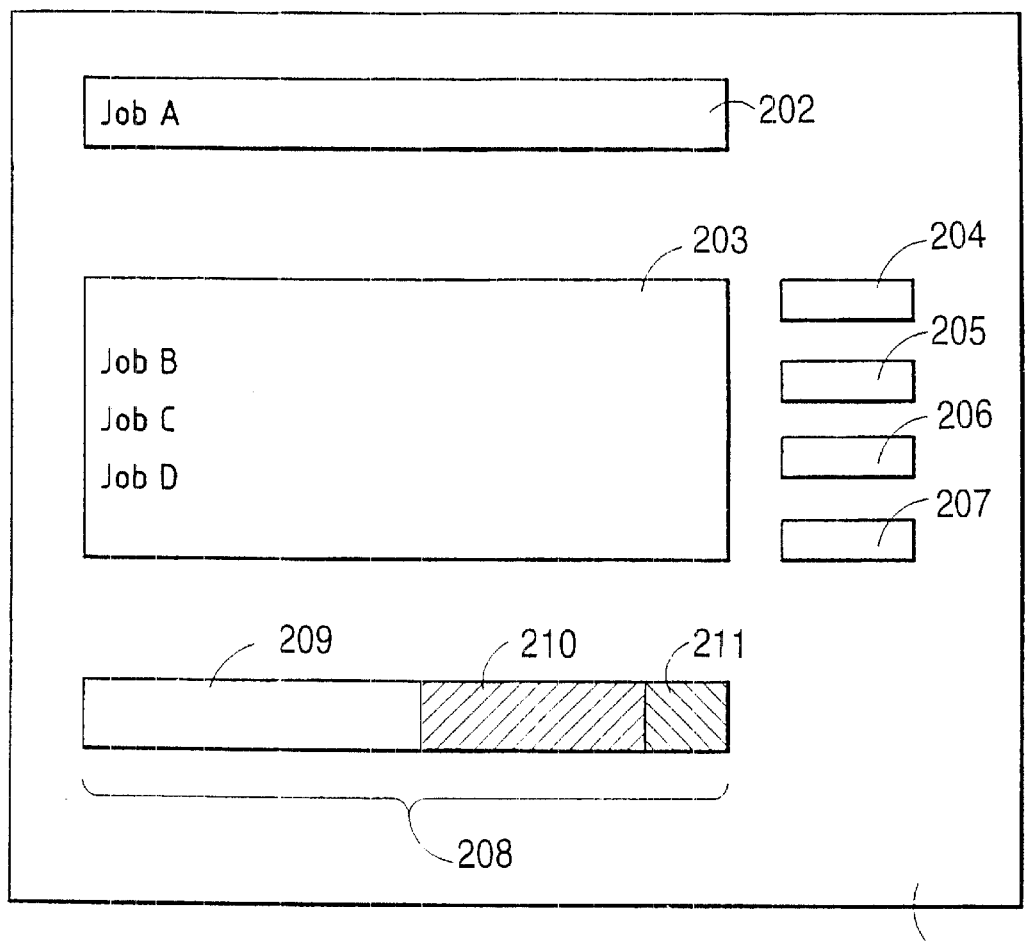

There shall now be described, by way of a non-limiting example, a preferred embodiment of the present invention with reference to the appended drawings in which:

FIG. 1 diagrammatically illustrates a reproduction system according to the invention; and FIG. 2 shows an operating screen according to the invention.

FIG. 1 diagrammatically illustrates a reproduction system 101 according to the invention. The system comprises scanning means 102, receiving means 103, memory means 104, printing means 105, sending means 106, control means 107 and user interface means 108. Memory means 104 comprise a spool area 104a and a set memory 104b. In the set memory, electronic images in the form of bitmaps ready for printing are queued.

The reproduction system offers the user a copy function, a printing function and a scanning function. The copy function provides the user with the possibility to copy paper originals. The user makes settings for such a copy job on the operating panel 108 and scans the paper originals with scanning means 102. The electronic original images derived from the paper originals are queued in the set memory 104b. Control unit 107 manages the queue as a queue of jobs and takes care that at the moment it is the turn of the supplied copy job to be printed, the electronic original images and the associated printing settings are communicated to the printing means 105. Printing means 105 ensure that prints are made in compliance with the settings. The printing function comprises the carrying out of print jobs supplied to the reproduction system via receiving means 103. Such print jobs are for example generated by workstations remotely coupled to the reproduction system 101 via a network. After reception, print jobs are placed in a spool area 104a of the memory 104. The data to be printed may be coded according to a variety of formats. From this spool area job data are interpreted and converted to bitmap images. These bitmaps are also stored in the set memory 104b.

The scanning function offers the user the possibility to scan paper originals and subsequently send these via the sending means 106 to a destination address. Upon scanning, paper originals are converted into bitmap data. These bitmap data are also placed in memory 104.

FIG. 2 shows an operating screen that displays the job queue. This operating screen will be displayed on a monitor screen, such as a CRT or LCD equipped with a touch-input device and being part of operating panel 108. In screen area 202, the active job is shown, in screen area 203 the queue of waiting jobs is displayed. At the right of the screen a number of buttons are displayed which can be activated e.g. by spatial related corresponding physical buttons on the control panel. Activation of button 204 aborts the active job. With button 205 the queue is put on hold. The active job will be finished, but no further jobs will be carried out. With selection button 206, a job from the queue can be selected, by scrolling through the list of queued jobs. By activation of the delete button 207, the job selected will be deleted.

According to the embodiment, the operating screen is provided with a memory meter in the form of a display bar 208. The length of bar 208 indicates how much set memory is already used. In the illustrated example, the bar is shown extended to its full length, corresponding to a maximum occupation, to illustrate more clearly the colour zones. The maximum length of the bar 208 is divided in three zones: zone 209 has the colour green and indicates that there is enough space left to print large jobs or many small jobs. Zone 210 has the colour orange and indicates that the set memory limit will be met soon. Zone 211 with the colour red indicates that the set memory is full or nearly full.

In the example illustrated in FIG. 2, the bar extends from the left to the right as the degree of memory occupation increases. As long as bar 208 is within zone 209, its colour remains green. As the memory occupation increases, the length of the bar 208 extends correspondingly. When it begins to enter the next zone 210, corresponding to an intermediate range, the portion of the bar within that zone is coloured orange. When the memory occupation continues to increase such that the bars extends into the next zone 211, corresponding to high memory occupation state, the portion of the bar within that zone is coloured red.

The threshold of zone 211 is set at a level corresponding to a warning indication that jobs should be removed from the queue or that existing print jobs have to be executed before new print data can be entered.

As an alternative to having portions of bar adopt different colours according to the zone(s) they are in, the bar can be attributed a uniform colour—green, orange or red—determined by the zone up to which it extends.

In all the above configurations, the bar 208 can be made to express the amount of free space left in the set memory rather than the amount space already used. In this case, the assignment of the zones shall be reversed correspondingly. For instance, if the colour positions and boundaries shown in FIG. 2 are kept as they are, the bar expressing the amount of free memory space shall extend from right to left in going from a low to a high free memory space indication.

It is also possible to consider the complement of bar 208 with respect to its maximum length as a bar indicating memory occupation.

In all these ways the user is clearly informed if he still can scan in a next original or a next job.

It shall be noted that the display bar 208 can alternatively be implemented with just two zones by omitting the orange zone and replacing it by an extension of the green zone and/or red zone.

As an alternative to using a colour display, it can be envisaged to provide colour filters positioned physically over a monochrome display (LCD or CRT) at areas corresponding to the display zones 209 through 211.

Other ways of visually indicating ranges in a distinct manner can be based on using different shaped symbols and/or different sized symbols to indicate units of memory occupation depending on the range in which they are situated.

In the above example, the different zones 209, 210 and 211 correspond to fixed ranges. A first variant of the invention shall now be described in which at least one of the ranges is settable in accordance with a user command. The apparatus and its operation is otherwise identical to the preceding description with reference to FIGS. 1 and 2 and shall therefore not be repeated for the sake of concision.

User interface means 108 als provides an operating screen by which the user is able to select a range whose boundaries are to be modified and modify those boundaries. The operating screen may allow any one of the ranges defined by zones 209, 210 and 211 respectively to be modified in this manner, or just the range corresponding to the zone 211 indicating that the set memory is full or nearly full.

In this way, the user can determine the visual indication ranges according to specific requirements and/or on the basis of the nature of the print jobs.

The zones are differentiated by colour on the monitor screen of the control panel, as in the main embodiment.

If the colour bar 208 is implemented with a monochrome display overlain with colour filters, at least one of the filters may made displaceable along the display area to provide a means of setting ranges. For instance, the red colour filter corresponding to zone 211 of FIG. 2 can be slideable to cover a variable extent of the display bar 208.

In a second variant of the invention, the degree of memory occupation ranges are settable automatically by the control means 107.

The control means 107 is programmed to determine the size of the print jobs about to enter the queue, and thereby estimate the number of print jobs that can be accommodated in the memory 104. The size of the print jobs can be determined by various means. For instance, a protocol can be established in which a part of the print data comprises a data sequence indicating its size. That data sequence can be read by the control means 107 at an initial stage and the information processed to establish whether the loading of the corresponding print job would cause an overflow condition in the set memory, or is at least likely to bring the state of occupation of the set memory close to an overflow condition. Depending on this information, the control means can modify the ranges identified on the display bar 208, e.g. by electronically configuring the colour code areas corresponding to the different ranges.

The control means 107 can be made additionally or separately to estimate the number of new print jobs that can be accommodated in the set memory on the basis of past statistics. For instance, the control means 107 can be programmed to analyse the data lengths of a given number of immediately preceding print jobs and determine whether they are grouped within a predetermined size limit to a degree where it can be reasonably expected, on a statistical basis, that one or more succeeding print jobs would have approximately the same order of size. If such is the case, the control means can adjust the ranges displayed accordingly. For example, the start of zone 210 shown in FIG. 2 can be adjusted to correspond to a given number of estimated print job(s) before an overflow condition is likely to occur.

Naturally, the different approaches to adjusting the size of the indicated ranges by the control means 107 can be combined or be chosen by the user. It is also envisageable to provide a manual override whereby the user can force his or her own choice of range sizes via user interface 108.

Where the range(s) is/are varied in by the control means 107, the display device, whether it be a monitor, a series of LEDs or an LCD panel, is controlled correspondingly to provide the appropriate visually distinct zones. It is also possible to consider an electro-mechanical device adapted to shift one or more colour filter over the display under instruction of the control means 107 to provide a similar function.

The operating screen of FIG. 2 may be displayed on the operating panel 108, as well as on a user interface screen of a printer driver application on a remote workstation. Buttons 204–207 are activated then e.g. by a pointing device like a mouse. In this way when a remote user specifies a job on his workstation he is able to estimate if the print data belonging to the job might exceed the remaining capacity of the set memory. In such case he is then able to postpone the submission of the job untill the memory meter shows that sufficient free space in the memory is available, to prevent memory overflow.

In a further embodiment the orange and red zone are displayed enlarged relative to the green zone, e.g. by applying different scales for the green zone and for the orange and red zones.

What is claimed is:

1. A print data management system comprising:
   means for receiving print data,
   memory means for storing said received print data,
   control means for controllably reading out data from said memory means and transferring said print data to printing means,
   visual indication means for informing a user of the degree of occupation of said memory means by said print data, wherein said visual indication means has at least first and second visually distinct forms of indication, respectively, corresponding to a range of relatively low occupation and a range of relatively high occupation of said memory means, and
   setting means for variably setting the extent of at least one range of occupation of said memory means.

2. The print data management system according to claim 1, wherein said visual indication means comprises a third form of indication, visually distinct from said first and second forms, and corresponding to an intermediate range of occupation of said memory means.

3. The print data management system according to claim 1, wherein the forms of indication are made distinct by color, each color corresponding to a respective range of occupation of said memory means.

4. The print data management system according to claim 1, wherein said visual indication means is provided on a monitor screen.

5. The print data management system according to claim 4, wherein said visual indication means is provided on a monitor screen of a remote workstation.

6. The print data management system according to claim 1, wherein said setting means comprises a data size-determining means operable to set said at least one range as a function of the size of print data received.

7. The print data management system according to claim 6, wherein said determining means is operative to estimate the size of expected input print data on the basis of the size of previously received print data.

8. A method of managing print data in a reproduction system comprising the steps of:

receiving print data, storing said received print data in memory means, controllably reading out data from said memory means and transferring said print data to printing means, providing a visual indication for informing a user of the degree of occupation of aid memory means by said print data, wherein the step of providing a visual indication involves providing at least first and second visually distinct forms of indication, respectively, corresponding to a range of relatively low occupation and a range of relatively high occupation, and variably setting the extent of at least one range of occupation of said memory means.

9. The method according to claim 8, wherein said providing step further includes providing a third form of indication, visually distinct from said first and second forms, and corresponding to an intermediate range of occupation of said memory means.

10. The method according to claim 8, wherein the forms of indication are made distinct by color, each color corresponding to a respective range of occupation of said memory means.

11. The method according to claim 8, wherein said setting step sets said at least one range as a function of the size of print data received.

12. The method according to claim 11, wherein said setting step includes estimating the size of expected input print data on the basis of the size of previously received print data.

13. A print data management system comprising:

a memory to store print data;

a controller to transfer the stored print data to a printer; and a user interface to indicate to a user a degree of occupation of the memory by the print data, the user interface including first and second distinct forms of indication respectively corresponding to a range of low occupation and a range of high occupation of the memory, the user interface further including a setting unit to variably set boundaries of at least one of the ranges of high and low occupations by the user.

14. The print data management system according to claim 13, wherein the user interface further includes a third form of indication, visually distinct from the first and second forms, and corresponding to an intermediate range of occupation of the memory.

15. The print data management system according to claim 13, wherein the forms of indication are made distinct by color, each color corresponding to a respective range of occupation of the memory.

16. The print data management system according to claim 13, wherein the setting unit includes a data size-determining unit operable to set the at least one range as a function of the size of print data received.

17. The print data management system according to claim 16, wherein the data size-determining unit is operative to estimate the size of expected input print data on the basis of the size of previously received print data.

* * * * *